United States Patent
Eleftheriou et al.

(10) Patent No.: US 7,864,467 B2
(45) Date of Patent: Jan. 4, 2011

(54) GAIN CONTROL FOR DATA-DEPENDENT DETECTION IN MAGNETIC STORAGE READ CHANNELS

(75) Inventors: Evangelos S. Eleftheriou, Zurich (CH); Robert A. Hutchins, Tucson, AZ (US); Sedat Oelcer, Kilchber (CH)

(73) Assignee: International Business Machines Corporation, Armonk, NY (US)

( * ) Notice: Subject to any disclaimer, the term of this patent is extended or adjusted under 35 U.S.C. 154(b) by 402 days.

(21) Appl. No.: 12/027,258

(22) Filed: Feb. 6, 2008

(65) Prior Publication Data

US 2009/0195909 A1 Aug. 6, 2009

(51) Int. Cl.
G11B 5/09 (2006.01)

(52) U.S. Cl. .................................................. 360/46

(58) Field of Classification Search ............... 360/46, 360/75, 66, 65, 63, 53, 27, 31
See application file for complete search history.

(56) References Cited

U.S. PATENT DOCUMENTS

| 3,662,365 | A | | 5/1972 | Rodriguez et al. |
| 4,581,725 | A | * | 4/1986 | Pilarcik, Jr. .................. 367/66 |
| 4,628,529 | A | * | 12/1986 | Borth et al. ................. 381/94.3 |
| 5,375,145 | A | * | 12/1994 | Abbott et al. ................ 375/345 |
| 5,416,642 | A | | 5/1995 | Nakagawara et al. |
| 5,796,535 | A | * | 8/1998 | Tuttle et al. .................... 360/51 |
| 5,828,719 | A | * | 10/1998 | He et al. .......................... 378/4 |
| 5,914,989 | A | | 6/1999 | Thapar et al. |
| 6,002,538 | A | | 12/1999 | Kanegae et al. |
| 6,163,420 | A | | 12/2000 | Poss |
| 6,304,200 | B1 | * | 10/2001 | Masuda ...................... 341/144 |
| 6,646,822 | B1 | * | 11/2003 | Tuttle et al. ................... 360/46 |
| 7,019,930 | B1 | | 3/2006 | Hennecken |
| 7,030,800 | B2 | * | 4/2006 | Arai et al. .................... 341/155 |
| 7,317,570 | B2 | * | 1/2008 | McClean et al. ......... 359/341.41 |
| 7,436,439 | B2 | * | 10/2008 | Yuyama et al. .......... 348/223.1 |
| 2005/0276359 | A1 | * | 12/2005 | Xiong ........................ 375/345 |
| 2006/0126205 | A1 | | 6/2006 | Hutchins |

OTHER PUBLICATIONS

Le, et al., An Adaptive Noise-Predictive Decision-Feedback Equalizer for the Magnetic Recording Channel; Communications, Computers and Signal Processing, 1999 IEEE Pacific Rim Conference; Aug. 22-24, 1999; pp. 560-563.

* cited by examiner

Primary Examiner—Fred Tzeng
(74) Attorney, Agent, or Firm—Dan Shifrin

(57) ABSTRACT

Method, apparatus and computer program product adjust gain in a read channel of a magnetic media data storage device. A digital signal sample having a data-dependent noise component is received. A gain value, stored in a location in a gain table, is selected in a data-dependent manner. The gain of the signal sample is adjusted in response to the selected gain value. A bit pattern is detected from the gain-adjusted signal sample and a data output signal is output based upon the detected bit pattern.

20 Claims, 4 Drawing Sheets

GAIN CONTROL FOR DATA-DEPENDENT DETECTION IN MAGNETIC STORAGE READ CHANNELS

TECHNICAL FIELD

The present invention relates generally to magnetic read channels and, in particular, to gain control for data-dependent detection.

BACKGROUND ART

Noise predictive maximum likelihood (NPML) system architecture has been extensively used by the magnetic recording field for hard disk drive (HDD) storage systems. NPML embeds a noise predictor in the sequence detection process and utilizes the decisions from each hypothesized path as a means to reliably estimate the noise samples. As a result, the embedded noise predictor de-correlates the noise and reduces its power in a very effective way, thereby improving the noise margin and/or substantially increasing the linear density of the recording system. This basic concept has been extended to include other forms of noise, notably data-depended noise, as well as other nonlinear effects that are present in the magnetic recording process. For example, a hybrid NPML detection system comprising a combination of FIR/IIR embedded predictors with an adaptive table-look-up based branch-metric computation has been proposed.

In magnetic tape recording systems, the noise process at the detector input is strongly data-dependent. Surface roughness, a phenomenon that manifests itself during the recording as well as during the readback process, is known to be one of the main reasons for data-dependent noise in tape systems. However, other phenomena also exist that contribute to creating a data-dependent noise component in the readback signal. These include transition or media noise, which is closely related to the granularity of the magnetic medium, and also residual intersymbol interference after signal equalization, which creates an undesired signal component that can be regarded as data-dependent noise.

SUMMARY OF THE INVENTION

The present invention includes an apparatus for adjusting the gain in a read channel of a magnetic media data storage device. The apparatus comprises a gain adjustment module, a gain table, a sequence detector and data-dependent means for selecting a gain value from the gain table. The gain adjustment module is configured to receive a digital signal sample having a data-dependent noise component and further configured to output a gain-adjusted signal sample. The gain table is configured to store gain values comprising values for all possible combinations of length-K bit sample patterns. The gain table includes an output to communicate a selected gain value to the gain adjustment module. The sequence detector is coupled to receive the gain-adjusted signal sample from the gain adjustment module and configured to output a data output signal. And, the data-dependent means communicates the gain selected from the gain table to the gain adjustment module.

The present invention further includes a method for adjusting gain in a read channel of a magnetic media data storage device. The method comprises receiving a digital signal sample having a data-dependent noise component, selecting a gain value stored in a location in from a gain table in a data-dependent manner, adjusting the gain of the signal sample in response to the selected gain value, detecting a bit pattern from the gain-adjusted signal sample, and outputting a data output signal based upon the detected bit pattern. The present invention also includes a computer program product of a computer readable medium usable with a programmable computer and having computer-readable code embodied therein for adjusting the gain in a magnetic media read channel.

DETAILED DESCRIPTION OF THE PREFERRED EMBODIMENT

Figure 1:
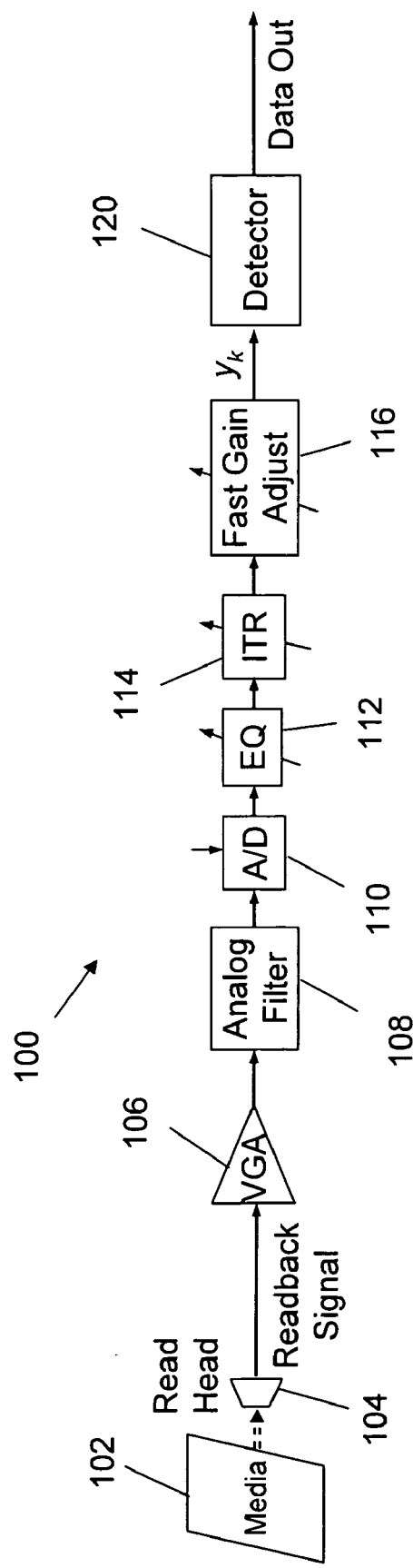
FIG. 1 is a block diagram of a data storage read channel in which the present invention may be incorporated.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module of executable code may, for instance, comprise one or more physical or logical blocks of computer instructions which may, for instance, be organized as an object, procedure, or function. A module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and may exist, at least partially, merely as electronic signals on a system or network.

Furthermore, the described features, structures, or characteristics of the invention may be combined in any suitable manner in one or more embodiments. In the following description, numerous specific details are provided, such as examples of programming, software modules, hardware modules, hardware circuits, etc., to provide a thorough understanding of embodiments of the invention. One skilled in the relevant art will recognize, however, that the invention can be practiced without one or more of the specific details, or with other methods, components and so forth. In other instances, well-known structures, materials, or operations are not shown or described in detail to avoid obscuring aspects of the invention.

To increase detection performance in read channels for data storage systems, it is desirable to take into account the data-dependent nature of the noise process and resort to data-dependent NPML (DD-NPML) detection structures. The present invention provides such performance and takes full advantage of the benefits of DD-NPML detection by performing automatic gain control in a data-dependent manner. A DD predictor achieves better noise prediction and whitening if the gain adjustment is done specifically for the data pattern on which the predictor is conditioned. This implies that the gain control is conditioned to the use of a particular predictor. Gain control may be embedded in the DD-NPML detector or may instead be realized externally to the detection itself. DD gain control is particularly important for detectors with a large number of states where signal gain, if not properly adjusted for each predictor, may lead to an increased detector sensitivity that in turn limits the achievable performance.

In accordance with the present invention, DD gain control, as mentioned above, may be performed either prior to DD-NPML detection or jointly with the DD-NPML detection process, i.e., within the sequence detector. The former approach leads to a relatively simple implementation and can be used, for example, to obtain the gain values during an initial acquisition mode for which the recorded data are a priori known to the read channel. The latter approach is more complex to implement but allows more accurate adjustment of the gains for better performance in data detection mode.

FIG. 1 is a block diagram of a data storage read channel 100 in which the present invention may be incorporated. An analog readback signal is generated by a read head 104 detecting magnetic transitions, representing user data, recorded on magnetic media 102. The readback signal is communicated to a variable gain amplifier 106 and filtered by an analog filter 108. The amplified and filtered signal is converted into a digital signal in an analog-to-digital (A/D) converter 110 and equalized by an adaptive equalizer 112. An interpolated timing recovery (ITR) module 114 acquires and maintains the correct sampling frequency and phase of the signal and the gain of the resulting signal is adjusted by a fast gain adjustment module 116. The output $y_k$ of the fast gain adjustment module 116 is a digital signal sample having a data-dependent noise component and is communicated to a data-dependent detector 120 of the present invention. The detector 120 processes the signal $y_k$ and outputs detected data bits which are further processed, e.g., by a modulation decoder, an error-correcting-code decoder, etc., and are ultimately communicated to a host device. It will be appreciated that the foregoing is merely an overview of the general operation of the read channel 100 and that it is not necessary to provide the details.

Figure 2:
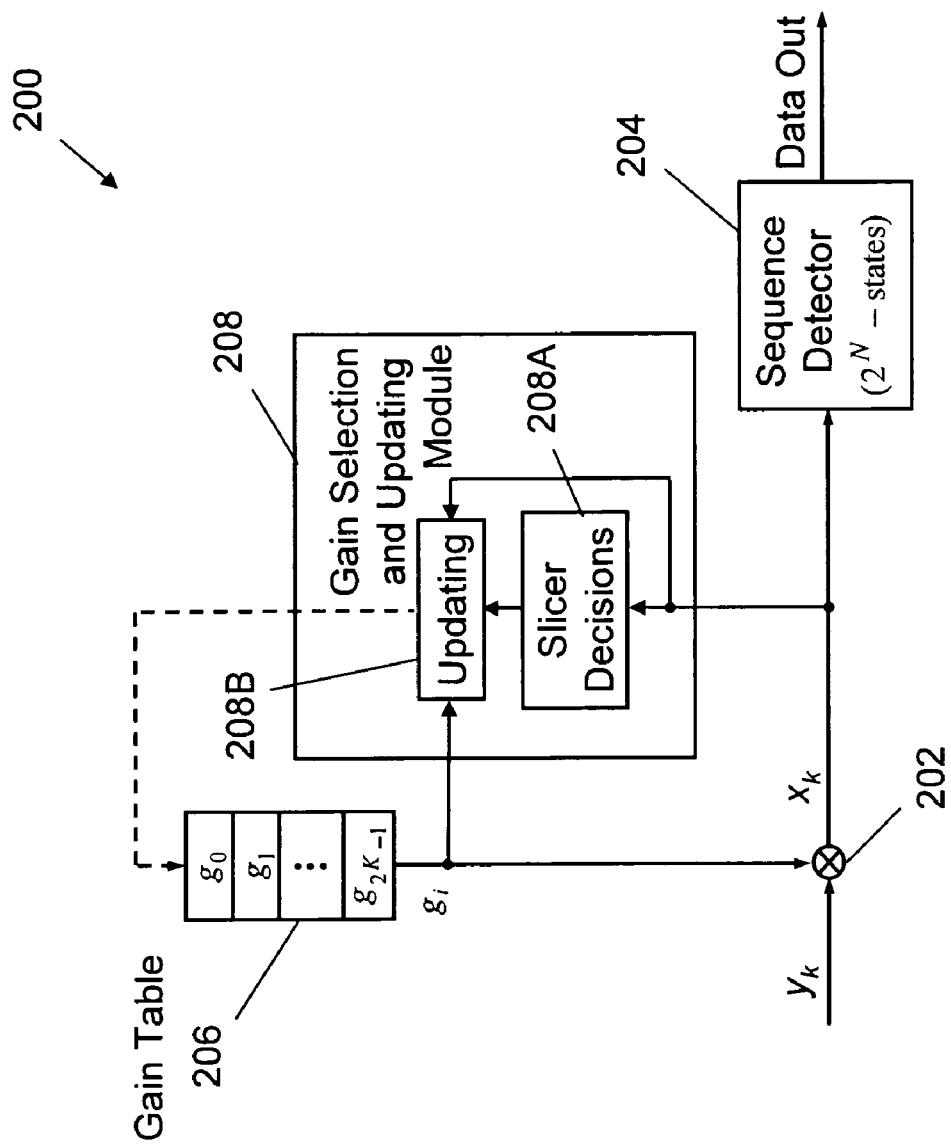
FIG. 2 is a block diagram of one embodiment of the gain control of the present invention.

A first embodiment of a data-dependent detector 200 of the present invention is shown in FIG. 2 which illustrates the detector portion 120 of the read channel 100. The signal $x_k$ after gain adjustment 202 is input to a sequence detector 204 that generates decisions on the recorded bits. The sequence detector 204 comprises a total of $2^N$ states and may be a DD-NPML detector itself.

In general, a slicer 208A within a gain selection and updating module 208 makes decisions on the signal samples, or equivalently on the data bits. A pattern of K consecutive data-bit decisions at time k is denoted by $\hat{a}_{k-K_1}^{k+K_2} = \{\hat{a}_{k-K_1}, \hat{a}_{k-K_1+1}, \ldots, \hat{a}_{k+K_2}\}$, with $K=K_1+K_2+1$. The decisions are regarded as addressing the entries of a gain table 206 (such as the memory locations of a RAM device) which stores gain values $g_0, g_1, \ldots, g_{2^K-1}$ for all possible combinations of length-K bit patterns. The gain value $g_i = g(\hat{a}_{k-K_1}^{k+K_2})$ corresponding to the K-bit pattern detected at time k is selected from a location in the gain table 206 based upon a location selection signal from the slicer 208A and communicated to the gain adjustment module 202. The input signal $y_k$ is then adjusted in gain, yielding the signal $x_k = g_i \cdot y_k$. The output of the gain adjustment module 202 and the output of the gain table 206, are input to the gain selection and updating module 208 whose output is fed back into the gain table 206. A short loop delay, which has here been omitted, is normally present in the implementation of this function.

Gain adaptation is performed in an updating module 208B as $g_{new}(\hat{a}_{k-K_1}^{k+K_2}) = f\{g(\hat{a}_{k-K_1}^{k+K_2}), x_k\}$, where $f$ denotes a suitable gain-updating function. For example, for zero-forcing gain updating, which is well known in the art, $f\{g(\hat{a}_{k-K_1}^{k+K_2}), x_k\} = g(\hat{a}_{k-K_1}^{k+K_2}) - \alpha(x_k - d_k)d_k$, where $d_k$ is the desired signal at time k and $\alpha$ is a step-size parameter. In a training or reference-directed mode that employs pre-specified data patterns, the desired signal $d_k$ is known and can directly be used by the updating module 208B. Otherwise, $d_k$ is obtained as a symbol decision on the signal $x_k$, as provided by the slicer decisions 208A shown in the gain selection and updating module 208. The new gain value is output from the gain selection and updating module 208 and stored in the gain-table 206 location with address $\hat{a}_{k-K_1}^{k+K_2}$, replacing the old gain value at this location. It will be appreciated that other suitable gain-updating functions may also be used.

Figure 3:
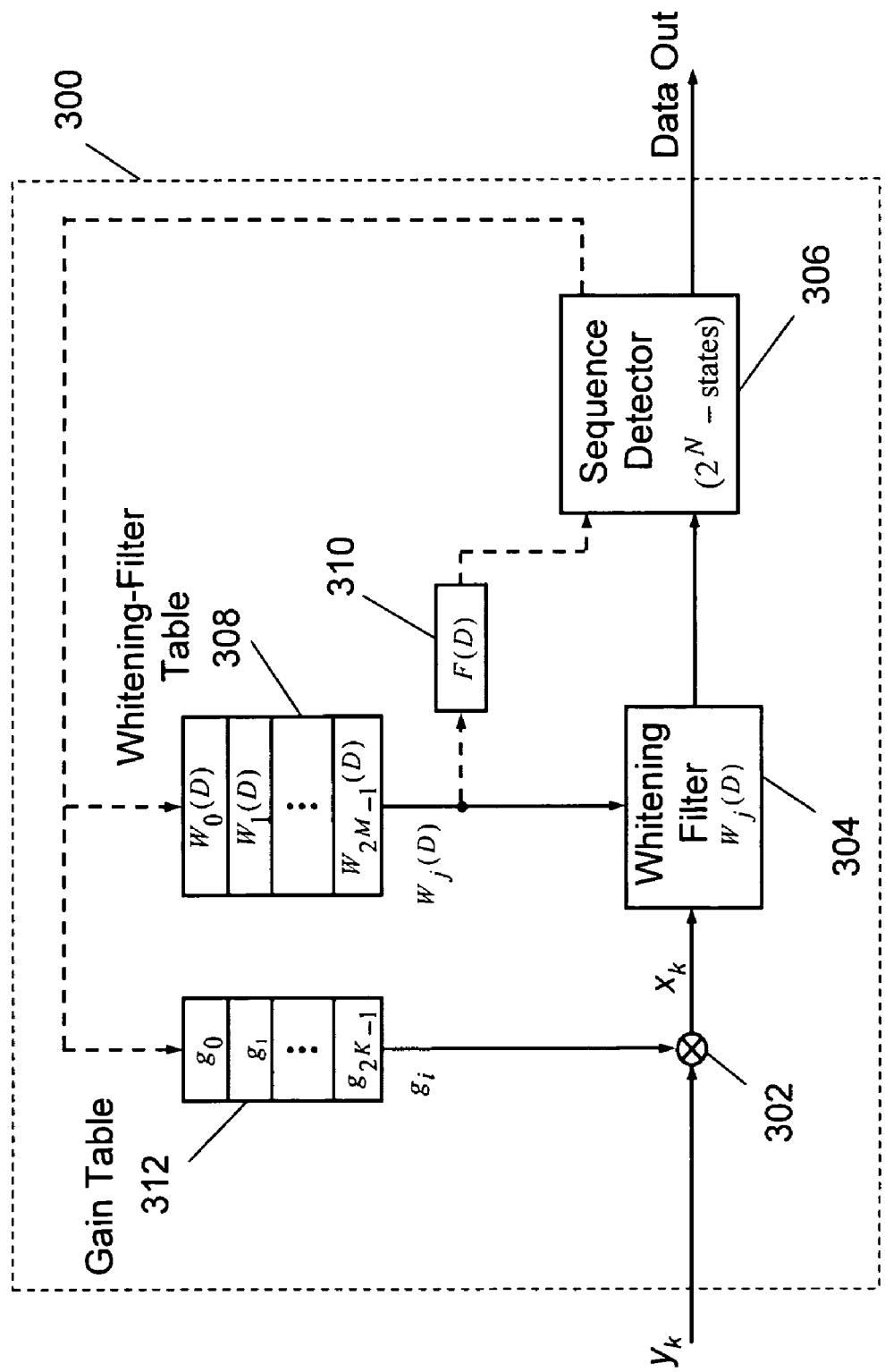
FIG. 3 is a block diagram of another embodiment of the gain control of the present invention within a data dependent detector with data dependent gain.

A second embodiment of the data-dependent detector of the present invention is shown in FIG. 3 which illustrates a different implementation of a detector 300 of the present invention. The signal $y_k$ at the input of the data dependent detector with data dependent gain 300 is a signal that has been shaped, through the combined effect of various analog and digital components in the read channel, towards a system characteristic defined by the polynomial F(D), where D denotes the delay operator corresponding to one bit interval. The data dependent detector with data dependent gain 300 scales the signal $y_k$ with the gain value of $g_i$ in a gain adjustment module 302 and filters the scaled signal by a whitening filter $W_j(D)$ in a whitening filter module 304, both in a DD manner, during the detection process represented by a sequence detector 306. More specifically, for a hypothesized bit pattern during the detection process, a specific whitening filter $W_j(D)$ is fetched from the whitening-filter table 308. The filter is used for signal filtering in the whitening-filter module 304 as well as obtaining, at the output of module 310, an expected signal level that corresponds to the transfer characteristic F(D). Likewise, for a hypothesized bit pattern during the detection process, a specific gain value is fetched from the gain value table 304. Hence, the adjustments to the input signal $y_k$ derived from both the whitening filter $W_j(D)$ and the gain value $g_i$, by effectively being fed back into the sequence detector 306, are used to compute the branch-metric for a hypothesized bit pattern. The hypothesized bit pattern is specified by the state transitions and survivor sequences within the sequence detector 306.

Let $S_k = \{a_{k-L}, \ldots, a_{k-1}\}$ denote a detector state at time k, where L represents the memory of the overall channel. Hence, N=L in FIG. 3. Upon reception of the signal sample $y_k$, gain adjustment is performed on each trellis branch of the sequence detector 306 and the gain-adjusted signals are used for branch-metric computations. Specifically, the gain value employed on the branch for state transition $S_k \rightarrow S_{k+1}$ is the one corresponding to the bit pattern $\tilde{a}_{k-K_1}^{k} = \{\tilde{a}_{k-K_1}, \tilde{a}_{k-K_1+1}, \ldots, \tilde{a}_k\}$ that is specified by the state pair $(S_k, S_{k+1})$ and, in case $K_1 > L$, also by the survivor data-sequence associated with state $S_k$. This bit pattern is also denoted by $\tilde{a}(S_k, S_{k+1})$ and the corresponding gain value by $g[\tilde{a}(S_k, S_{k+1})]$. Similar to the first embodiment, this gain value is extracted from a gain table 312 and provided to the gain adjustment module 302. For the state transition $S_k \rightarrow S_{k+1}$, gain adjustment on the signal $y_k$ yields the signal $x_k(S_k \rightarrow S_{k+1}) = g[\tilde{a}(S_k, S_{k+1})] \cdot y_k$, which is used for the branch metric computation.

The gain value is updated for the state $S_{k+1}$ at time k+1 as follows. If $\{\ldots, S_k, S_{k+1}\}$ denotes the survivor sequence associated with state $S_{k+1}$, with the corresponding bit pattern $\tilde{a}_{k-K_1}^{\ k}$, gain updating is performed within the data dependent detector with dependent gain 300 as $g_{new}(\tilde{a}_{k-K_1}^{\ k})=f\{g(\tilde{a}_{k-K_1}^{\ k}),x_k(S_k\to S_{k+1})\}$.

For example, the zero-forcing algorithm may take the form, $f\{g(\tilde{a}_{k-K_1}^{\ k}),x_k(S_k\to S_{k+1})\}=g(\tilde{a}_{k-K_1}^{\ k})-\alpha[x_k(S_k\to S_{k+1})-d(S_k\to S_{k+1})]\cdot d(S_k\to S_{k+1})$ where $d(S_k\to S_{k+1})$ denotes the nominal signal value for state transition $S_k\to S_{k+1}$. In a more general formulation of the algorithm, the gain is dependent on future data symbols as well, i.e., the selected gain values are specified by the bit pattern $\tilde{a}_{k-K_1}^{\ k+K_2}=\{\tilde{a}_{k-K_1},\tilde{a}_{k-K_1+1},\ldots,\tilde{a}_{k+K_2}\}$. By modifying the state definition accordingly and taking $N=K_1+K_2$, the technique described above may be extended to this case.

Figure 4:
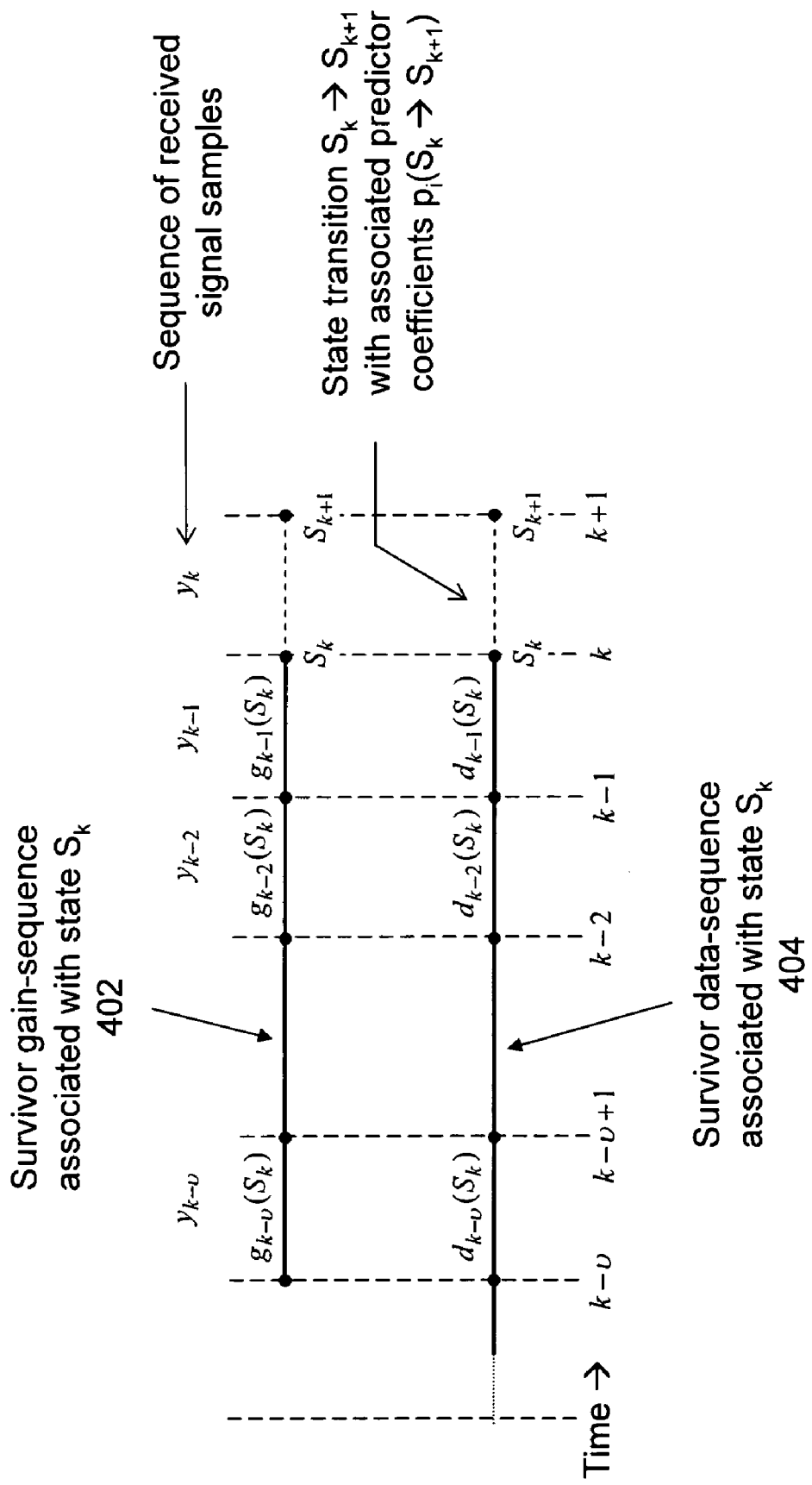
FIG. 4 is a sequence diagram illustrating the detection process of a modification of the embodiment of FIG. 3.

In a modification of the second embodiment, the gains obtained for each state within the sequence detector are further stored within the sequence detector 306, so that at each step of the detection algorithm, each state has an associated survivor data-sequence as well as an associated survivor gain-sequence or "gain trajectory." As illustrated in the sequence diagram of FIG. 4, at each step of the detection process, survivor gain-sequences 402 are re-arranged for all the states in the same manner as survivor data-sequences, which is well known to those skilled in the art of sequence detection. The depth of the survivor gain-sequences corresponds to the length of the whitening (or prediction) filters, and is thus much shorter than the depth of the survivor data-sequences 404. To compute the branch metrics, the current signal sample $y_k$ is scaled in gain as described in the second embodiment (FIG. 3) and, according to the embodiment of FIG. 4, past signal samples, which are needed to compute a predicted noise sample, are also scaled in gain, using gain values stored by the survivor gain-sequences 402. For state transition $S_k\to S_{k+1}$, the predicted noise sample is obtained as $$\hat{n}_k(S_k\to S_{k+1})=\sum_{i=1}^{\upsilon}p_i(S_k\to S_{k+1})[g_{k-i}(S_k)y_{k-i}-d_{k-i}(S_k)],$$

where $p_i(S_k\to S_{k+1})$, $i=1,\ldots,\upsilon$, denote the coefficients of the prediction filter used for transition $S_k\to S_{k+1}$, $d_{k-i}(S_k)$ denotes the nominal signals along the survivor data-sequence associated with state $S_k$, $g_{k-i}(S_k)$ denotes the survivor gain-sequence values associated with state $S_k$ and $\upsilon$ represents the number of coefficients in the whitening or noise prediction filter.

Another embodiment augments the basic sequence detection algorithm in a manner that is similar to the second embodiment. The gain values are, however, updated in a maximum-likelihood (ML) manner. With this scheme, the resulting signal is adjusted in gain more accurately than, for example, using the zero-forcing algorithm described above. Let the signal $x_k$ be written as $x_k=(1+\Delta g)d_k+n_k$, where $\Delta g$ denotes the gain error and $\{n_k\}$ the noise process. It can be shown that an instantaneous value of the ML estimate of the adjustment signal $\Delta g$ is given by $\Delta g_k^{ML}=\epsilon_k\tilde{\delta}_k/\sigma_k^2$ where $$\varepsilon_k=e_k-\sum_{i=1}^{\upsilon}p_i e_{k-i},$$

$$e_k=x_k-\tilde{\delta}_k$$

and $$\tilde{\delta}_k=\hat{\delta}_k-\sum_{i=1}^{\upsilon}p_i\tilde{\delta}_{k-i}.$$

$$p_i,\, i=1,\ldots,\upsilon$$

represents the coefficients of a length-$\upsilon$ predictor for the noise process $\{n_k\}$ used by the DD-NPML detector, $x_k$ represents the current gain adjusted signal and $\hat{\delta}_k$ indicates signal values along trellis branches and survivor sequences that are "consistent" with the bit patterns on which the data dependent predictor is conditioned. This predictor is dependent on the bit pattern $\tilde{a}_{k-K_1}^{\ k+K_2}$ and has an associated prediction error variance $\sigma_k^2$ (the data-dependency is not explicitly indicated in order to keep the notation simple). Similarly, the $\tilde{\delta}_k$ indicates signal values along trellis branches and survivor sequences that are "consistent" with the bit patterns on which the DD predictors are conditioned. Note that in the case of non data-dependent additive white Gaussian noise (AWGN), the ML gain-error estimate may be written as $\Delta g_k^{ML}=e_k\tilde{\delta}_k$ which is the known zero-forcing gain-control gradient. The ML gain-error estimate is used to update the gain value for the state with the best metric at time k, similar to the second embodiment. The data dependent maximum-likelihood gain updating algorithm is given by $g_{new}(\tilde{a}_{k-K_1}^{\ k+K_2})=g(\tilde{a}_{k-K_1}^{\ k+K_2})-\alpha\Delta g_k^{ML}$, where $g(\tilde{a}_{k-K_1}^{\ k+K_2})$ denotes the gain value corresponding to the bit pattern $\tilde{a}_{k-K_1}^{\ k+K_2}=\{\tilde{a}_{k-K_1},\tilde{a}_{k-K_1+1},\ldots,\tilde{a}_{k+K_2}\}$ before updating and $g_{new}(\tilde{a}_{k-K_1}^{\ k+K_2})$ denotes the new gain value corresponding to the bit pattern $\tilde{a}_{k-K_1}^{\ k+K_2}=\{\tilde{a}_{k-K_1},\tilde{a}_{k-K_1+1},\ldots,\tilde{a}_{k+K_2}\}$ obtained after updating, $\alpha$ is the adjustment step-size and $\Delta g_k^{ML}$ the adjustment signal.

A still further embodiment employs the ML estimates of the gain error as described for the previous embodiment but maintains and employs survivor gain-sequences as described with respect to the embodiment of FIG. 4.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies regardless of the particular type of signal bearing media actually used to carry out the distribution. Examples of computer readable media include recordable-type storage media such as a floppy disk, a hard disk drive, a RAM, and CD-ROMs and other storage media.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for adjusting gain in a read channel of a magnetic media data storage device.

What is claimed is:

1. An apparatus for adjusting gain in a read channel of a magnetic media data storage device, comprising:

a gain adjustment module configured to receive a digital signal sample having a data-dependent noise component and further configured to output a gain-adjusted signal sample;

a gain table configured to store gain values, the gain values comprising values for all possible combinations of length-K bit sample patterns, the gain table having an output to communicate a selected gain value to the gain adjustment module;

a sequence detector coupled to receive the gain-adjusted signal sample from the gain adjustment module and configured to perform bit pattern detection and output a data output signal; and data-dependent means for selecting a gain value from the gain table to communicate to the gain adjustment module.

2. The apparatus of claim 1, the data-dependent means comprising a gain updating module, comprising:

a first input coupled to receive the gain-adjusted signal sample from the gain adjustment module;

a slicer configured to determine a K-bit pattern from the gain-adjusted signal sample at time k and generate a selection signal representative of a location in the gain table; and an output coupled to communicate the selection signal to the gain table, wherein the selected gain value is communicated from the table location to the gain adjustment module.

3. The apparatus of claim 2, the data-dependent means further comprising an updating module configured to implement a gain-updating function responsive to the slicer output and to the gain table output and further configured to generate a new gain value in response to the gain-updating function to replace an existing gain value at a selected location in the gain table.

4. The apparatus of claim 1, the data-dependent means comprising:

a whitening filter module interposed between the output of the gain adjustment module and the input of the sequence detector; and a whitening-filter table configured to store whitening filters and coupled to communicate a selected whitening filter to the whitening filter module;

the sequence detector further configured to, in response to the detected bit pattern:

generate a selection signal, representative of locations in the gain table and the whitening-filter table; and communicate the selection signal to the gain table and to the whitening-filter table;

wherein the selected whitening filter and the selected gain value provide feed-back adjustments to the bit pattern detection performed by the sequence detector.

5. The apparatus of claim 4, wherein the sequence detector is further configured to perform a gain adjustment on each trellis branch during bit pattern detection.

6. The apparatus of claim 5, wherein the sequence detector is further configured to, during bit pattern detection, perform a gain adjustment on each trellis branch in a maximum-likelihood manner in which an instantaneous value of a maximum-likelihood estimate of an adjustment signal $\Delta g$ is given by $\Delta g_k^{ML} = \epsilon_k \delta_k / \sigma_k^2$.

7. A method for adjusting gain in a read channel of a magnetic media data storage device, comprising:

receiving a digital signal sample having a data-dependent noise component;

selecting a gain value stored in a location in from a gain table in a data-dependent manner;

adjusting the gain of the signal sample in response to the selected gain value;

detecting a bit pattern from the gain-adjusted signal sample; and outputting a data output signal based upon the detected bit pattern.

8. The method of claim 7, wherein selecting the gain value comprises:

determining a K-bit pattern from the gain-adjusted signal sample at time k;

in response to the determined K-bit pattern, generating a selection signal representative of a location in the gain table; and communicating the selection signal to the gain table, wherein the gain of the signal sample is adjusted in response to the gain value stored in the gain table location.

9. The method of claim 8, further comprising:

implementing a gain-updating function responsive to the determined K-bit pattern and to the selected gain value; and in response to the gain-updating function, generating a new gain value to replace an existing gain value at a selected location in the gain table.

10. The method of claim 7, wherein selecting the gain value comprises:

performing a whitening filter function on the gain-adjusted signal sample based upon a selected whitening filter in a whitening-filter table;

in response to the detected bit pattern:

generating a selection signal, representative of locations in the gain table and the whitening-filter table; and communicating the selection signal to the gain table and to the whitening-filter table;

wherein the selected whitening filter and the selected gain value provide feed-back adjustments for the bit pattern detection.

11. The method of claim 10, further comprising performing a gain adjustment on each trellis branch during the bit pattern detection.

12. The method of claim 11, further comprising, during bit pattern detection, performing a gain adjustment on each trellis branch in a maximum-likelihood manner in which an instantaneous value of a maximum-likelihood estimate of an adjustment signal $\Delta g$ is given by $\Delta g_k^{ML} = \epsilon_k \delta_k / \sigma_k^2$.

13. A magnetic media read channel, comprising:

a read head for detecting magnetic transitions from a magnetic media and generating an analog readback signal;

an analog-to-digital converter coupled to the read head to convert the analog readback signal into digital signal;

an adaptive equalizer coupled to the analog-to-digital converter to equalize the digital signal;

an interpolated timing recovery module coupled to the adaptive equalizer to acquire and maintain a correct sampling frequency and phase of the digital signal and output a digital signal sample having a data-dependent noise component;

a gain adjustment module coupled to receive the digital signal sample having a data-dependent noise component from the interpolated timing recovery module and configured to output a gain-adjusted signal sample;

a gain table configured to store gain values, the gain values comprising values for all possible combinations of length-K bit sample patterns, the gain table having an output to communicate a selected gain value to the gain adjustment module;

a sequence detector coupled to receive the gain-adjusted signal sample from the gain adjustment module and configured to perform bit pattern detection and output a data output signal; and data-dependent means for selecting a gain value from the gain table to communicate to the gain adjustment module.

14. The magnetic media read channel of claim 13, the data-dependent means comprising a gain updating module, comprising:

a first input coupled to receive the gain-adjusted signal sample from the gain adjustment module;

a slicer configured to determine a K-bit pattern from the gain-adjusted signal sample at time k and generate a selection signal representative of a location in the gain table;

an updating module configured to implement a gain-updating function responsive to the slicer output and to the gain table output and further configured to generate a new gain value in response to the gain-updating function to replace an existing gain value at a selected location in the gain table; and an output coupled to communicate the selection signal to the gain table, wherein the selected gain value is communicated from the table location to the gain adjustment module.

15. The magnetic media read channel of claim 13, the data-dependent means comprising:

a whitening filter module interposed between the output of the gain adjustment module and the input of the sequence detector; and a whitening-filter table configured to store whitening filters and coupled to communicate a selected whitening filter to the whitening filter module;

the sequence detector further configured to, in response to a detected bit pattern:

perform a gain adjustment on each trellis branch during bit pattern detection;

generate a selection signal, representative of locations in the gain table and the whitening-filter table; and communicate the selection signal to the gain table and to the whitening-filter table;

wherein the selected whitening filter and the selected gain value provide feed-back adjustments to the bit pattern detection performed by the sequence detector.

16. A computer program product of a computer readable medium usable with a programmable computer, the computer program product having computer-readable code embodied therein for adjusting gain in a magnetic media read channel, the computer-readable code comprising instructions for:

receiving a digital signal sample having a data-dependent noise component;

selecting a gain value stored in a location in from a gain table in a data-dependent manner;

adjusting the gain of the signal sample in response to the selected gain value;

detecting a bit pattern from the gain-adjusted signal sample; and outputting a data output signal based upon the detected bit pattern.

17. The computer program product of claim 16, wherein the instructions for selecting the gain value comprises instructions for:

determining a K-bit pattern from the gain-adjusted signal sample at time k;

in response to the determined K-bit pattern, generating a selection signal representative of a location in the gain table; and communicating the selection signal to the gain table, wherein the gain of the signal sample is adjusted in response to the gain value stored in the gain table location.

18. The computer program product of claim 17, further comprising instructions for:

implementing a gain-updating function responsive to the determined K-bit pattern and to the selected gain value; and in response to the gain-updating function, generating a new gain value to replace an existing gain value at a selected location in the gain table.

19. The computer program product of claim 16, wherein the instructions for selecting the gain value comprises instructions for:

performing a whitening filter function on the gain-adjusted signal sample based upon a selected whitening filter in a whitening-filter table;

in response to the detected bit pattern:

generating a selection signal, representative of locations in the gain table and the whitening-filter table; and communicating the selection signal to the gain table and to the whitening-filter table;

wherein the selected whitening filter and the selected gain value provide feed-back adjustments for the bit pattern detection.

20. The computer program product of claim 19, further comprising instructions for performing a gain adjustment on each trellis branch during the bit pattern detection.

* * * * *